R. McINTURFF.
MOTH-TRAP.
No. 186,430. Patented Jan. 23, 1877.
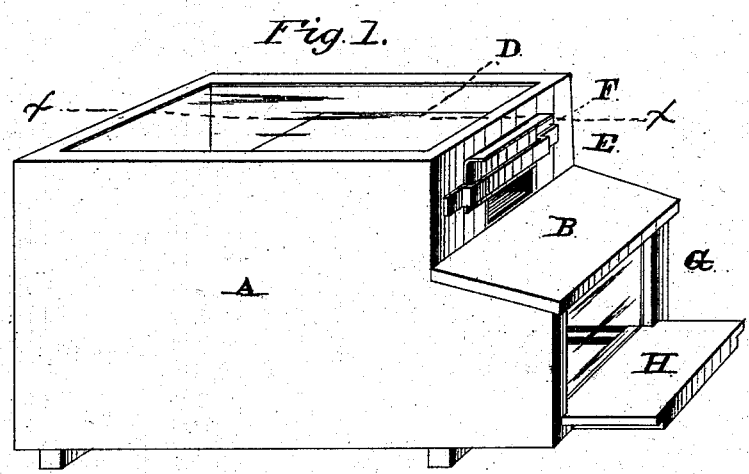
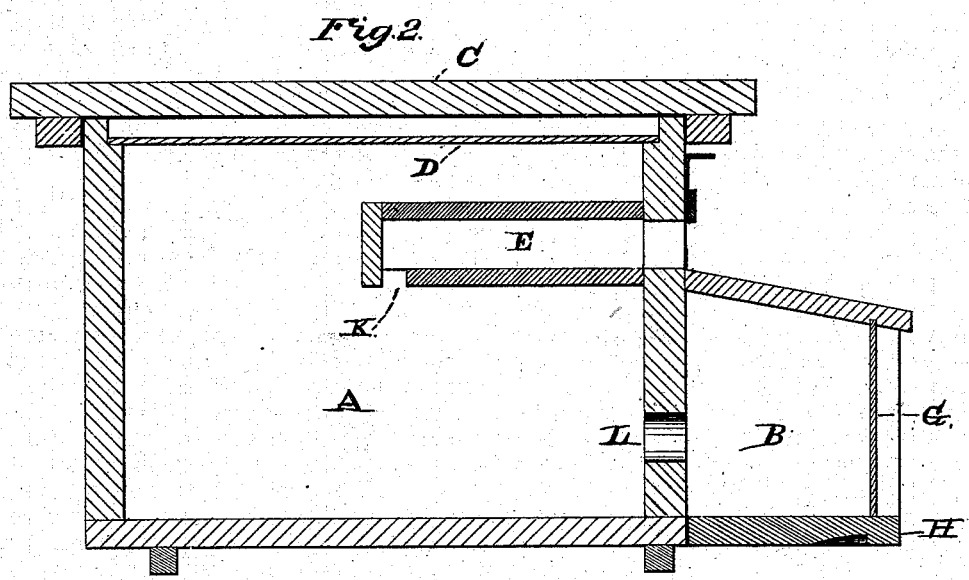
Witnesses:
Wm. M. Moore
J. M. Gudger
Inventor:
Robt. McInturff

UNITED STATES PATENT OFFICE.

ROBERT McINTURFF, OF YANCY COUNTY, NORTH CAROLINA.

IMPROVEMENT IN MOTH-TRAPS.

Specification forming part of Letters Patent No. 186,430, dated January 23, 1877; application filed December 7, 1876.

*To all whom it may concern:*

Be it known that I, ROBERT McINTURFF, of the county of Yancy, in the State of North Carolina, have invented a new and useful Bee-Moth Trap, which is fully described in the following specification and represented in the accompanying drawings, making a part of the same.

My invention consists of an independent moth-trap, having communicating bait and decoy compartments, as will be hereinafter fully described.

Referring to the drawings, Figure I is a perspective view of the trap. Fig. II is a vertical section of Fig. I taken on the line *x x*.

A is the bait-compartment, and B the decoy-department. The bait-compartment is preferably of rectangular form, although any shape would be equally well adapted for the purpose. The top part of the box is rabbeted, and is provided with a glass cover, D, over which is fitted a cover of wood, or other opaque material, C. A tubular piece, E, is fitted into this compartment. This tube is open at the front end and closed at the back. It is provided at the front with a slide, F, which is attached to the front wall of the compartment in any suitable manner, and may be opened or closed at pleasure.

The tube is about half the length of the box, is fitted into the front wall of the bait-compartment, near the top thereof, and is provided with a slot, K, at its rear end, through which the moths enter the compartment. The illuminated decoy-compartment B is attached to, or forms a part of the bait-compartment; but is only about half the height of the latter. It is provided in front with a light or pane of glass, G, and on its under side with the removable slide H. The partition which divides the two compartments is perforated, as at L, to admit the moth into the decoy-compartment.

The operation of the trap is as follows: The glass cover is applied to the bait-compartment, and the front slide raised to expose the end of the tube. Lured by a bait, consisting of sweetened vinegar and refuse honey-comb, or any other suitable substance, which has previously been deposited in the bottom of the bait-compartment, the moths enter the tube and pass into the box through the slot K in the end of the tube. The opaque cover being on the box, and rendering it dark, they are allured by the light from the decoy-department B, which they enter through the opening L, where they soon die, being unable to find their way back into the box B on account of the darkness. The slide at the bottom of compartment B is then removed and the dead moths taken out, or if still alive are easily destroyed.

As many of these traps as may be necessary are placed among the hives containing bees, and, being so much easier of access than the hive, the latter are effectually protected against the inroads of the moths.

The trap, constructed as hereinbefore described, is to be placed among the hives containing the bees, and as many as may be desirable or necessary may be used.

I am aware that moth-traps have been used, constructed with, and forming part of, the bee-hive; but I am not aware that an independent moth-trap has been used before.

Having thus described my invention, what I claim as new, and desire to secure by Letters Patent, is—

An independent moth-trap, having the bait-compartment provided with the glass cover D, opaque cover C, slide F, perforation L, and entrance-tube E, having a slot or opening, K, in combination with the decoy-compartment, having the illuminated front G and slide H, substantially as and for the purpose specified.

ROBT. McINTURFF.

Witnesses:
JAMES McCAMPBELL,
S. W. CARTER.